United States Patent Office 3,404,144
Patented Oct. 1, 1968

3,404,144
1-β-D-ARABINOFURANOSYL-5-FLUOROCYTOSINE
COMPOUNDS
Jack J. Fox, White Plains, and Naishun C. Miller, Riverdale, N.Y., assignors to Research Corporation, New York, N.Y., a non-profit corporation of New York
No Drawing. Filed Dec. 23, 1965, Ser. No. 516,133
4 Claims. (Cl. 260—211.5)

This invention relates to novel 1-β-D-arabinofuranosyl-5-fluorocytosine compounds, and a method and intermediates for synthesizing them.

The novel 1 - β - D-arabinofuranosyl-5-fluorocytosine nucleoside has the following structural formula:

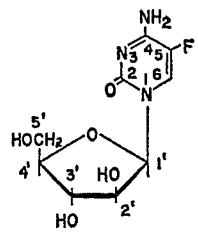

It is an active antimetabolite and is active against viruses, bacteria and fungi. It is particularly effective in controlling *Herpes simplex*. It has also shown a high activity against transplanted mouse leukemias P815 and P388. The novel 1-β-D-arabinofuranosylcytosine is a useful intermediate in the preparation of its nucleotides by well-established phosphorylation procedures [e.g. Walwick et al. Proc. Chem. Soc., 84 (1959); and Michelson, "The Chemistry of Nucleosides and Nucleotides," Academic Press, Inc., 1963, pp. 99–152].

The new process provides a convenient synthesis of 1-β-D-arabinofuranosyl-5-fluorocytosine having the general formula

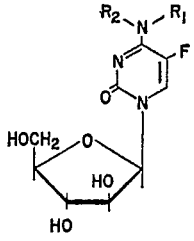

wherein $R_1$ and $R_2$ are hydrogen, alkyl or alkenyl groups of from 1 to 8 carbon atoms, aralkyl, cycloalkyl or cycloalkenyl groups.

In the method of the invention 1-β-D-arabinofuranosyl-5-fluorouracil (FUA) is acylated and thiated selectively to a 4-thio-nucleoside. The 4-thio-nucleoside is then alkylated and the 4-alkylmercapto compound is reacted with ammonia or primary or secondary amines to give 1-β-D-arabinofuranosyl-5-fluorocytosine or its N-substitution products.

For the purpose of illustration, a preferred form of the method of the invention is schematically represented as follows:

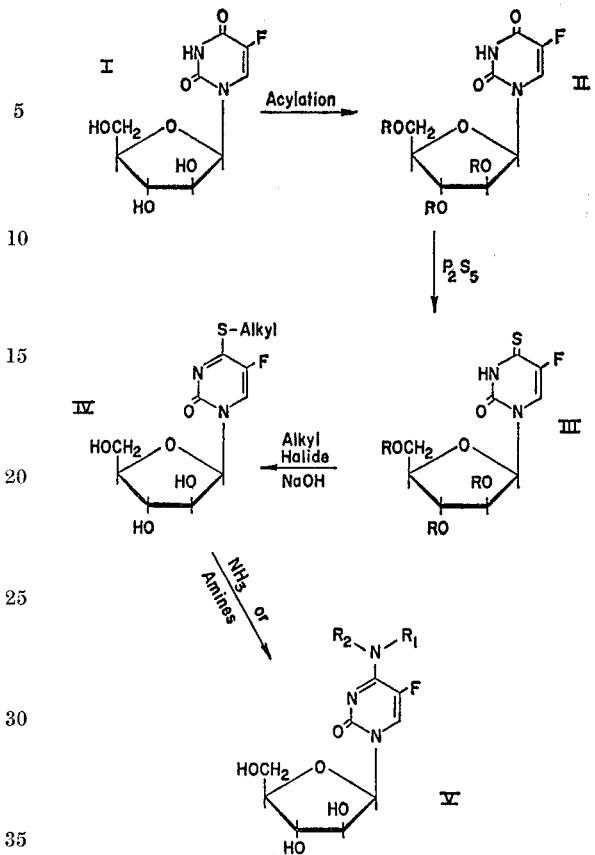

The novel 1 - β-D-arabinofuranosyl-5-fluorocytosine nucleosides are prepared from the 1-β-D-ribofuranosyl-5-fluorouracil (FUA). The starting material (FUA) is a known compound whose synthesis was described previously [Fox et al., J. Am. Chem. Soc., 83, 4060–4065 (1961); Fox et al., Abstr. International Union of Pure and Applied Chemistry (Symposium on Natural Products), Australia, (1960), p. 66]. FUA (Compound I in flow chart) is acylated to its 2′, 3′, 5′-tri-O-acyl derivative (II) in which R is an acyl group by acylation with an acyl anhydride in pyrimidine. The fully acylated 5-fluoro-nucleoside (II) is then thiated with phosphorous pentasulfide, a process which selectively replaces the 4-oxo group by a thione, to give the 4-thio-nucleoside III. The 4-thio-blocked nucleoside (III) is then alkylated with a lower-alkyl bromide or iodide in an alkaline medium to give the 4-alkyl mercapto-5-fluoro nucleoside IV. Treatment of the 4-alkylthio-nucleoside with liquid ammonia replaces the 4-alkylthio group by an amino group. 1-β-D-arabinofuranosyl-5-fluorocytosine (FCA, V, flow chart, $R_1$ and $R_2$=H) is thus obtained in good overall yield from I.

The 4-thione derivative (III) may be oxidized by iodine to the disulfide derivative VI.

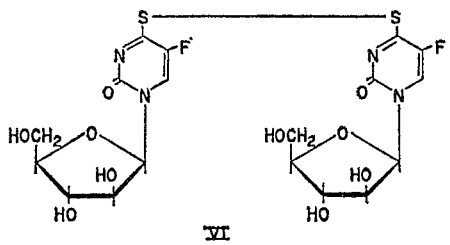

This new process as depicted in the flow chart provides a convenient method for the synthesis of 5-fluoro-pyrimidine arabino nucleosides of the general formula:

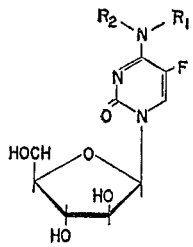

where $R_1$ and $R_2$ are hydrogen or hydrocarbon groups by the action of appropriate amines having a replaceable hydrogen on the 4-methylmercapto-5-fluoronucleoside (IV). The conversion of the 4-thione (III) to the 4-alkylmercapto derivative (IV) is of special advantage. While treatment of the 5-fluoro-4-thione (IV) directly with ammonia will also give V, the yields are lower due to loss or replacement of the 5-fluoro atom. The introduction of the alkylation step which converts III or IV, is especially useful in that it permits facile displacement of the alkylmercapto group by liquid ammonia and amines without effect on the 5-fluoro atom. Furthermore, the alkylation of the thione (III) has the advantage of removing the sugar blocking acyl groups at the same time the 4-thione is selectively alkylated to (IV).

This use of liquid ammonia to displace the 4-methylmercapto group by ammonia is of special advantage because high temperatures are not required and isolation of 1-β-D-arabinofuranosyl-5-fluorocytosine is readily obtained without the formation of troublesome by-products. The invention is further disclosed in the following examples which are illustrative of the principles of the invention. Temperatures are stated in degrees centigrade, corrected. The yields are also merely illustrative.

Example I.—Preparation of 1-(tri-O-acetyl-β-D-arabinofuranosyl)-5-fluorouracil (II)

Acetic anhydride (8.0 ml.) was added to a solution of 60 ml. anhydrous pyridine containing 5.4 g. of FUA (I). The clear solution was stirred for 16 hrs. at room temperature. Ethanol (about 10 ml.) was added and the solution was evaporated in vacuo to a thin sirup. Pyridine was removed by repeated evaporation and addition of 50% ethanol after which crystallization of II occurred. The mixture was cooled to complete crystallization and after filtration the solid was washed with water and dried, yield 7.78 g. (98%), M.P. 139–143°. Ultraviolet absorption properties in 50% ethanol: maxima at 205 and 265 mμ; minimum at 232 mμ.

Example 2.—Preparation of 1-(tri-O-acetyl-β-D-arabinofuranosyl)-4-thio-5-fluoro-2-pyrimidinone (III)

Phosphorus pentasulfide (4.44 g.,) was added to a solution of 40 ml. of pyridine (reagent grade), containing 3.88 g., of II. The mixture was refluxed with stirring for 4 hrs. The reaction was monitored as follows: A small sample was removed from the reaction mixture and evaporated to dryness. Repeated addition and evaporation using 50% ethanol gave a gummy solid free from pyridine. The ultraviolet absorption spectrum of the gummy residue in 50% ethanol gave two maxima, at 267 mμ for the starting material and at 334 for the thiated product. The ratio of extinctions at 267/334 mμ was about 4, indicating approximately 10% thiation. Phosphorus pentasulfide (4.44 g.) was again added to the stirred reaction mixture and refluxing contained for 4 hrs. The ratio at 267/334 mμ of 0.7 was obtained indicating about 60% thiation. A third addition of 4.44 g. of phosphorus pentasufide was made and the reaction was refluxed for 4 more hrs. Ultraviolet examination of the reaction product gave a ratio (267/334) of about 0.2. The pyridine mixture was cooled and decanted from an oily crystalline deposit. The decantate was evaporated to dryness in vacuo. Water (250 ml.) was added to the residue and on stirring a yellow granular solid separated. The solid was dissolved in methylene chloride and filtered from some insolubles. The filtrate was evaporated to a sirup and methanol added. A small amount of insolubles was removed by filtration. After cooling, crystallization took place. In several runs, yields of crude material ranged from 3.0 to 3.6 gms. Recrystallization of several batches from methanol gave yellow needles of varying melting points ranging from 59°–120°. The absorption spectra of all these recrystalized batches were identical (max. 334 and 244 mμ, ratio 334/224 mμ=5.6 in 50% ethanol). This material, as well as the crude material, was of sufficient purity for subsequent reactions.

Example 3.—Preparation of 1-β-D-arabinofuranosyl-4-methylmercapto-5-fluoro-2-pyrimidinone (IV)

The 5-fluoro-4-thione derivative (III in flow chart) from Example 2 was dissolved in 250 ml. of methanol, 50 ml. of water and 9.0 g. of methyl iodide. To the stirred solution, 34.5 ml. of N sodium hydroxide was added dropwise over a period of 40 min. The resulting solution (pH 8) was neutralized with acetic acid to about pH 6 and the methanol removed by evaporation in vacuo. Crystallization of long light-yellow needles occurred in the aqueous solution. Three crops yielded 8.3 g. (87%) of 1-β-D-arabinofuranosyl-4-methylmercapto-5-fluoro-2-pyrimidinone. Recrystallization from hot water gave a pure, colorless material, M.P. 140–141°. Ultraviolet properties in 50% ethanol: maxima at 202.5, 277.5, 315 mμ; minima at 237.5, 292.5 mμ; shoulder at 220 mμ; ratio at 277.5/315 mμ, 0.79. The absence of acetyl groups in this product was verified by the absence of acetoxy resonances in the n.m.r. spectrum. $[\alpha]_D^{23}+219$ (c. 0.22, in methanol).

Example 4.—Preparation of 1-β-D-arabinofuranosyl-5-fluorocytosine (FCA)

The 4-methylmercapto-5-fluoro derivative (IV in flow chart, R=CH₃ from Example 3 (5.0 g.,) was allowed to remain at room temperature in 25 ml. of anhydrous ammonia overnight. Ammonia was removed in vacuo. About 50 ml. of water was added and the residual ammonia was neutralized to about pH 5 with acetic acid. The solution was evaporated to a crystalline residue and 10 ml. of water was added. Crystallization of FCA took place. Two crops of FCA were obtained, 3.4 g., M.P. 232–233° (dec., efferv. with previous browning at 210°). FCA was purified on a column of Dowex 50 (H+) 100–200 mesh, by first washing with water until free of ultraviolet absorbing material, then eluting with normal ammonium hydroxide. The ammonia eluates containing ultraviolet absorbing material were combined and evaporated to a crystalline residue, which was recrystallized in 90% ethanol. Two crops of colorless needles yielded 3.2 g., M.P. 237–238° (to a brown liquid with previous browning at 225°), $[\alpha]_D^{23}+163\pm2$ (c., 0.18, in water).

Ultraviolet absorption properties of FCA: in N HCl, maxima at 221 and 290.5 mμ, ε max. 10,300 and 11,900 respectively; minimum at 246 mμ; ε min. 1,160; at pH 5–7, maxima at 235 and 280 mμ, ε max. 7,860 and 8,240, respectively; minima at 225 and 257.5 mμ, ε min. 7,550 and 5,240 respectively: pKa (spectrophotometrically determined), 2.33±0.05.

Example 5.—Preparation of the disulfide of 1-β-D-arabinofuranosyl-4-thio-5-fluoro-2-pyrimidinone (VI)

Crude 1-β-D-arabinofuranosyl-4-thio-5-fluoro-2-pyrimidinone (300 mg.) was allowed to stand overnight at room temperature in 20 ml. of methanol saturated with hydrogen chloride. The solution was evaporated to dryness and azeotroped repeatedly with ethanol. The sirup did not crystallize. It was treated with 20 ml. phosphate buffer (pH 6.8). N Iodine solution was added dropwise (total 1.3 ml.) to pH 4. Immediately a white amorphous material precipitated. The solid was collected and washed with water, ethanol and ether, yield, 120 mg., M.P. 199–203° dec. Recrystallization from 50% ethanol gave minute crystals, 50 mg., M.P. 213–214° (to amber liquid with efferv., with previous browning at 210°). Ultraviolet absorption properties in 50% ethanol: maxima at 215, 260, 327.5 mµ; minima at 205, 234, 288 mµ; ratio at 260/327.5 mµ is 0.66.

The work on which this application was based was financed in whole or in part by the Public Health Service.

We claim:

1. 1 - (β - D - arabinofuranosyl) - 4 - alkylmercapto - 5-fluoro-2-pyrimidinones in which the 4-alkyl group contains from one to eight carbon atoms.

2. 1 - (β - D - arabinofuranosyl) - 4 - methylmercapto-5-fluoro-2-pyrimidinone.

3. The method of making 1-(β-D-arabinofuranosyl)-5-fluorocytosine which comprises treating 1-(β-D-arabinofuranosyl)-4-alkylmercapto-5-fluoro - 2 - pyrimidinones in which the 4-alkyl group contains from one to eight carbon atoms with liquid ammonia.

4. The method of making 1-(β-D-arabinofuranosyl)-5-fluorocytosine which comprises treating 1-(β-D-arabinofuranosyl)-4-methyl - mercapto - 5-fluoro-2-pyrimidinone with liquid ammonia.

References Cited

UNITED STATES PATENTS

| 3,328,388 | 6/1967 | Shen et al. | 260—211.5 |
| 3,002,965 | 10/1961 | Fox et al. | 260—211.5 |

OTHER REFERENCES

Underwood et al., "Chem. Abst." vol. 62, 1965, p. 6991(e).

Fox et al., "Jour. Amer. Chem. Soc." vol. 80, No. 7, Apr. 5, 1958, pp. 1669–1675.

Chu et al., "Chem. Abst." vol. 57, 1962, p. 9146(b).

LEWIS GOTTS, *Primary Examiner.*

E. G. LOVE, *Assistant Examiner.*